(12) United States Patent
Holzapfel et al.

(10) Patent No.: US 10,571,310 B2
(45) Date of Patent: Feb. 25, 2020

(54) POSITION-MEASURING DEVICE

(71) Applicants: DR. JOHANNES HEIDENHAIN GmbH, Traunreut (DE); Sandra Trautner, Bad Kissingen (DE)

(72) Inventors: Wolfgang Holzapfel, Obing (DE); Christoph Lingk, Traunstein (DE); Johannes Trautner, Traunwalchen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 144 days.

(21) Appl. No.: 15/830,945

(22) Filed: Dec. 4, 2017

(65) Prior Publication Data

US 2018/0209821 A1 Jul. 26, 2018

(51) Int. Cl.
*G01D 5/34* (2006.01)
*G01D 5/347* (2006.01)
*G01D 5/38* (2006.01)

(52) U.S. Cl.
CPC ....... *G01D 5/3473* (2013.01); *G01D 5/34715* (2013.01); *G01D 5/38* (2013.01)

(58) Field of Classification Search
CPC ..... G01D 5/3473; G01D 5/38; G01D 5/34715
See application file for complete search history.

(56) References Cited

U.S. PATENT DOCUMENTS

| | | | |
|---|---|---|---|
| 7,348,546 B2 * | 3/2008 | Schoser | G01D 5/2457 250/231.13 |
| 2011/0157599 A1 * | 6/2011 | Weaver | G01D 5/266 356/496 |
| 2016/0245642 A1 * | 8/2016 | Holzapfel | G01D 5/38 |

FOREIGN PATENT DOCUMENTS

| | | |
|---|---|---|
| DE | 3210614 C2 | 10/1982 |
| DE | 3727188 A1 | 4/1988 |

(Continued)

OTHER PUBLICATIONS

R. Pettigrew, "Analysis of Grating Imaging and its Application to Displacement Metrology," SPIE vol. 36, 1st European Congress on Optics Applied to Metrology (1977), pp. 325 to 332.

(Continued)

*Primary Examiner* — Tony Ko
(74) *Attorney, Agent, or Firm* — Hunton Andrews Kurth LLP (57) ABSTRACT

In a position-measuring device for determining the position of a first object with respect to a second object that is displaceable relative to the first object, a measuring standard is connected to the first object and includes at least one periodic scale grating, which is arranged as a transmission grating and has a first periodicity. A scanning unit is connected to the second object and includes at least one light source, at least one periodic scanning grating, which has a second periodicity, and a detector system, which includes detector regions that are sensitive to radiation and are periodically disposed at a third periodicity in a detection plane. The bundles of rays emitted by the light source first impinge upon the scale grating and then pass through the scanning grating. The interaction of the bundles of beams with the scale grating and the scanning grating produces a periodic fringe pattern having the third periodicity in the detection plane which, when scanned with the aid of the detector system, makes it possible to generate a plurality of incremental signals that are phase-shifted relative to one another. The scanning grating is arranged between at least one first and one second transparent, plate-shaped carrier element, and the space between the scanning grating and the detector regions is completely filled with a material that has a refractive index of n>1.3. The clearance between the scale grating and the adjacent boundary surface of the first carrier element is in the range of 10 μm to 200 μm.

15 Claims, 4 Drawing Sheets

(56) References Cited

FOREIGN PATENT DOCUMENTS

| | | |
|---|---|---|
| DE | 19854733 A1 | 5/2000 |
| EP | 0350586 A2 | 1/1990 |
| EP | 1722201 A2 | 11/2006 |

OTHER PUBLICATIONS

European Search Report issued in European Patent Application No. 18 15 1547, dated May 9, 2018 (2 pages total).

* cited by examiner

POSITION-MEASURING DEVICE

CROSS-REFERENCE TO RELATED APPLICATIONS

The present application claims priority to Application No. 10 2017 201 257.9, filed in the Federal Republic of Germany on Jan. 26, 2017, which is expressly incorporated herein in its entirety by reference thereto.

FIELD OF THE INVENTION

The present invention relates to a position-measuring device, which is, for example, suitable for the highly precise determination of the relative position of two objects that are situated so as to be displaceable relative to each other in at least one measuring direction.

BACKGROUND INFORMATION

The document, R. Pettigrew, "Analysis of Grating Imaging and its Application to Displacement Metrology," appearing in SPIE Vol. 36, 1st European Congress on Optics Applied to Metrology (1977), pages 325 to 333, describes a position-measuring device that is based on an optical 3-grating scanning principle. Such a position-measuring device makes it possible to generate phase-shifted incremental signals with regard to the relative movement of two objects that are displaceable relative to each other in at least one measuring direction. One of the two objects is connected to a measuring standard that extends in the measuring direction and includes at least one scale grating. In the case of a transmitted-light scanning principle, the scale grating includes scale-grating regions of different optical transmittances that are periodically disposed in the measuring direction at a first periodicity $d_1$. A scanning unit that includes the scanning-side components of the position-measuring device is connected to the other object. Among these components are at least one light source, a scanning grating, and a detector system. The scanning grating includes scanning-grating regions that are periodically disposed in the measuring direction at periodicity $d_2$ and feature different optical properties. The detector device includes a plurality of detector regions that are sensitive to radiation and are periodically disposed in a detection plane in the measuring direction at a third periodicity $d_3$. The bundles of rays emitted by the light source first impinge upon the scale grating and subsequently pass through the scanning grating. The interaction of the bundles of beams with the scale grating and the scanning grating produces a periodic fringe pattern having a third periodicity $d_3$ in the detection plane of the detector system. By scanning the fringe pattern or the periodically disposed detector regions with the aid of the detector system, it is possible to generate a plurality of phase-shifted incremental signals.

Such position-measuring devices, for example, are used in applications in which the position of a displaceable machine component in relation to a stationary machine component must be detected with the highest precision in a machine in order to carry out an exact relative positioning of these machine components via a machine control. If these machines involve machine tools, for instance, then this results in operating conditions that may adversely affect the operability of the optical position-measuring device. For example, it is possible that contamination such as cooling lubricants or oil mist are deposited on optical components of the position-measuring device, e.g., on the scanning grating. In the extreme case, this may cause the position-measuring device to fail.

To protect the scanning grating in a comparable scanning configuration of an optical position-measuring device, it is described in German Patent No. 32 10 614 to position the particular side of the carrier element on which the scanning grating is situated so that it faces away from the measuring standard. In addition, the scanning grating is coated by a protective element that is transparent to light. Since the measuring standard constitutes the second impinged-upon grating in this position-measuring device, contamination of the protective layer of the measuring standard and contamination in the interspace between the measuring standard and the third grating may also lead to especially disadvantageous adverse effects on the signals.

SUMMARY

Example embodiments of the present invention provide a position-measuring device based on an optical 3-grating scanning principle in which the most reliable protection of the scanning grating against possible contamination is ensured and an excellent quality of the generated signals is simultaneously guaranteed.

According to an example embodiment of the present invention, a position-measuring device for determining the position of a first object with respect to a second object that is displaceable with regard to the first object in at least one measuring direction includes a measuring standard that extends in the measuring direction and is connected to the first object, and a scanning unit that is connected to the second object. At least one periodic scale grating is provided on the side of the measuring standard, which is arranged as a transmission grating and has a first periodicity $d_1$. The scanning unit has at least one light source, at least one periodic scanning grating that has a second periodicity $d_2$, and a detector system, which includes radiation-sensitive detector regions periodically disposed at a third periodicity $d_3$ in the measuring direction in a detection plane. The bundles of rays emitted by the light source first impinge upon the scale grating, and then pass through the scanning grating. The interaction of the bundles of rays with the scale grating and the scanning grating then produces a periodic fringe pattern having the third periodicity $d_3$ in the detection plane. When this fringe pattern is scanned with the aid of the detector system, a plurality of incremental signals is able to be generated that are phase-shifted with respect to one another. The scanning grating is situated between at least one first and one second transparent, plate-shaped carrier element, and the space between the scanning grating and the detector regions is completely filled with a material that has a refractive index of n>1.3. The clearance between the scale grating and the adjacent boundary surface of the first carrier element is selected to be in the range of 10 µm to 200 µm.

The clearance between the scale grating and the adjacent boundary surface of the first carrier element may be selected to be in the range of 20 µm to 50 µm.

It is possible to form the plate-shaped carrier elements from glass.

As an alternative, it may also be provided that the first plate-shaped carrier element is made of glass and the second plate-shaped carrier element is made of transparent plastic.

In addition, the plate-shaped carrier elements may have a thickness of at least 0.1 mm.

The plate-shaped carrier elements may have a maximum thickness of 5 mm.

The scanning grating may be disposed on one of the two boundary surfaces of the two carrier elements facing each other.

The scanning grating may be arranged as an amplitude grating and may include scanning-grating regions that have different optical transmittances.

As an alternative, the scanning grating may also be arranged as a phase grating and may include scanning-grating regions having different optical phase displacements.

It is furthermore possible that the following relations apply to the first periodicity of the scale grating and the third periodicity of the resulting fringe pattern in the detection plane:

$$d_1 = d_2 \cdot ((u_1 + u_2/n_{u2}) + v/n_v)/(v/n_v)$$

and $$d_3 = d_2 \cdot ((u_1 + u_2/n_{u2}) + v/n_v)/(u_1 + u_2/n_{u2})$$

in which: $d_1$ represents the first periodicity of the scale grating; $d_2$ represents the effective second periodicity of the scanning grating; $d_3$ represents the third periodicity of the fringe pattern resulting in the detection plane; $u_1$ represents the clearance between the scale grating and the adjacent boundary surface of the first carrier element; $u_2$ represents the thickness of the first carrier element placed between the scale grating and the scanning grating; v represents the thickness of the second carrier element placed between the scanning grating and the detection plane; $n_{u2}$ represents the refractive index of the first carrier element; and $n_v$ represents the refractive index of the second carrier element.

A reliable protection of the scanning grating in the position-measuring device from contamination is ensured via the measures described herein. On the one hand, the surface of the scanning grating is protected against contamination by fluids; on the other hand, the interspace between the scanning grating and the detection plane can also be reliably protected against such contamination. The sensitivity of the optical scanning with regard to potential contamination of the scanning grating is thereby considerably reduced, which results in greater availability of the optical position-measuring device even under unfavorable conditions.

In addition, the measures described herein provide for a very small clearance between the two oppositely situated boundary surfaces of the measuring standard and the scanning unit. Fluid droplets that may possibly be present on the surface of the measuring standard are able to be flattened due to the low clearance and no longer negatively affect the optical scanning and signal generation.

Further features and aspects of example embodiments of the present invention are described in more detail below with reference to the appended Figures.

DETAILED DESCRIPTION

Figure 1:
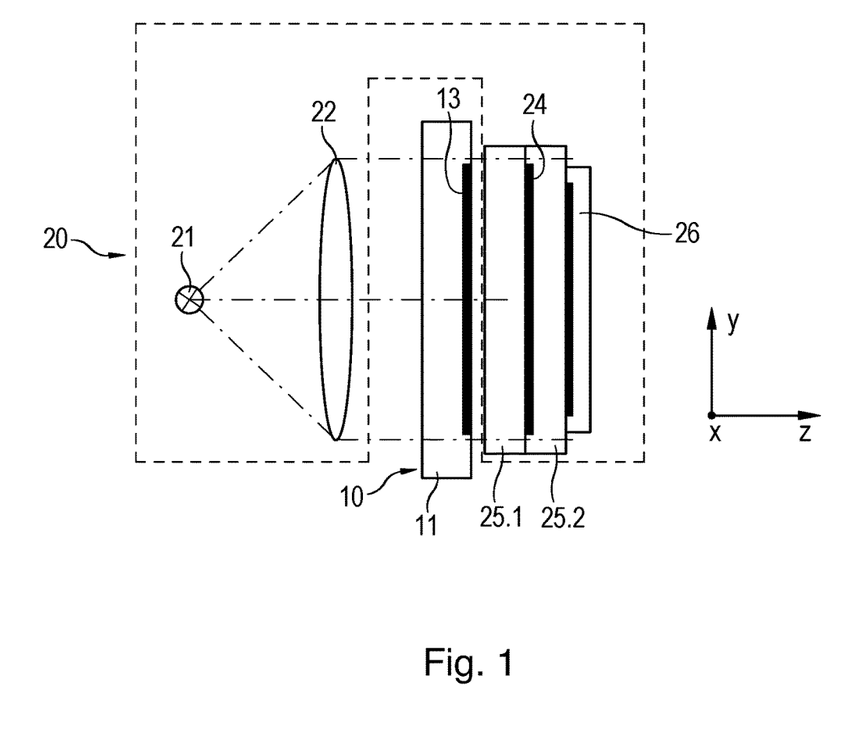
FIG. 1 is a schematic cross-sectional view of a position-measuring device according to an example embodiment of the present invention.
Figure 2A:
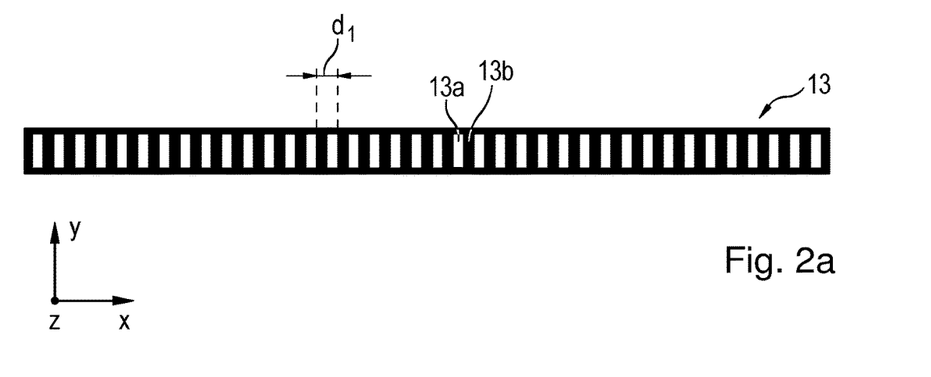
FIG. 2a is a plan view of the measuring standard of the position-measuring device.
Figure 2B:
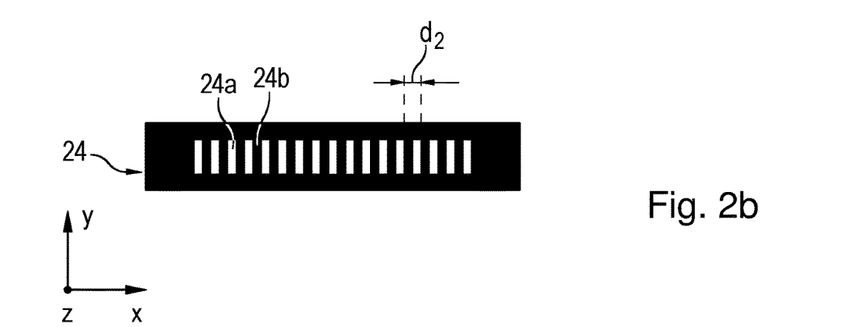
FIG. 2b is a plan view of the scanning plate of the position-measuring device.
Figure 2C:
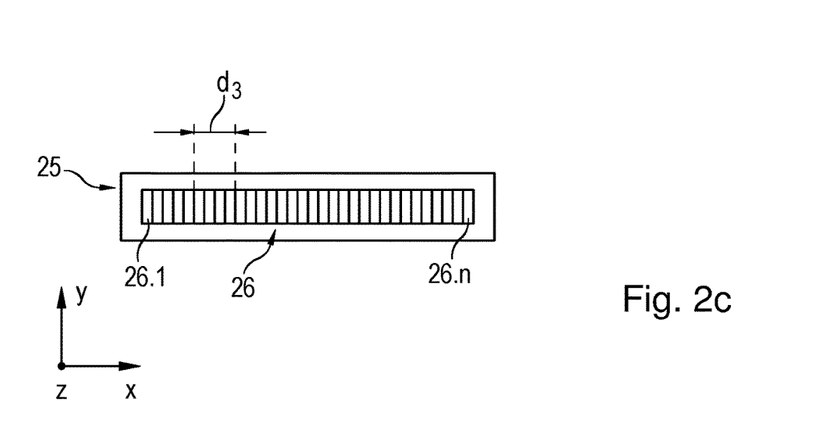
FIG. 2c is a plan view of the detector device of the position-measuring device.
Figure 3:
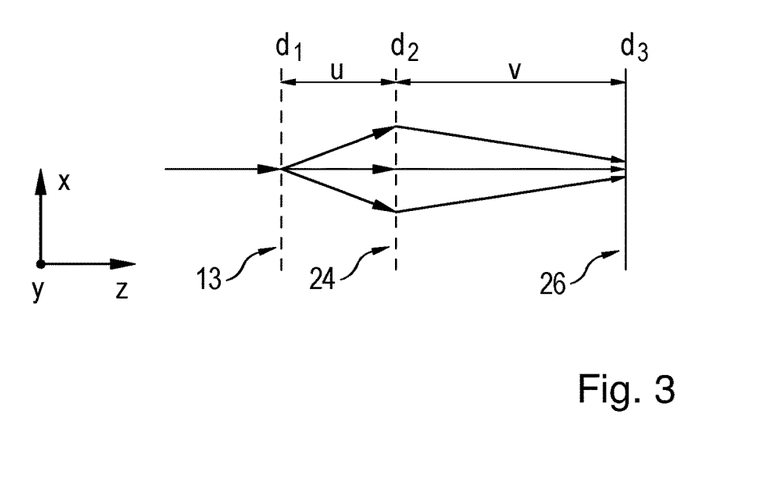
FIG. 3 schematically illustrates the optical path in the position-measuring device including different system parameters.
Figure 4:
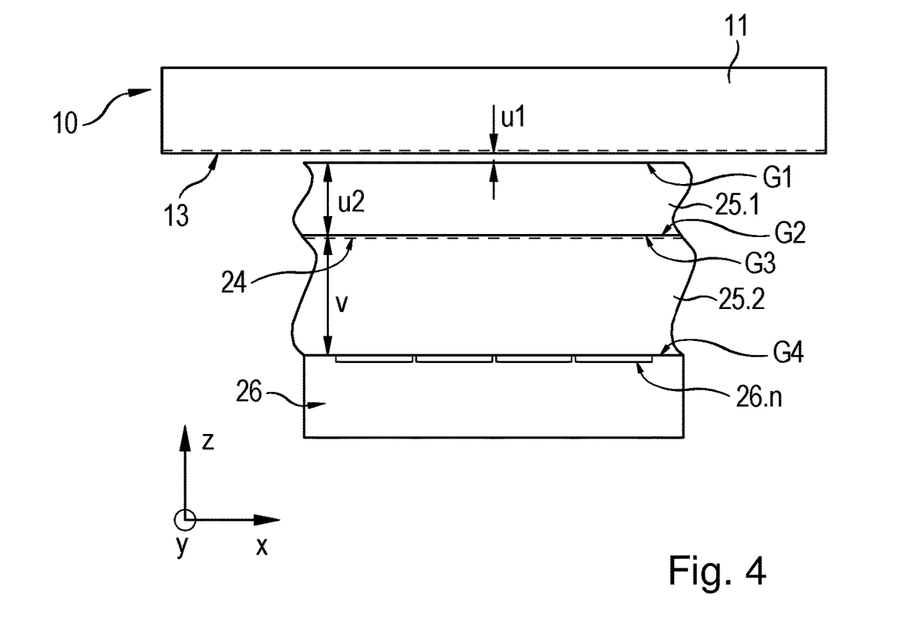
FIG. 4 is an enlarged partial view of the scanning unit of the position-measuring device.

An optical position-measuring device according to an example embodiment of the present invention is described in more detail below with reference to FIGS. 1, 2a-2c, and 3. FIG. 1 is a schematic cross-sectional view, and FIGS. 2a through 2c are plan views of the measuring standard, the scanning plate, and the detector device, respectively. FIG. 3 illustrates the basic optical path for the signal generation including various system parameters, and FIG. 4 is an enlarged partial view of the scanning unit.

On the one hand, the optical position-measuring device includes a measuring standard 10, which extends in a measuring direction x and has a periodic scale grating 13 having a first periodicity $d_1$. On the other hand, a scanning unit 20 is provided, which is able to be displaced relative to measuring standard 10 in measuring direction x. Scanning unit 20 has at least one light source 21, a periodic scanning grating 24 of a second periodicity $d_2$, and a detector system 26. In this example embodiment, measuring direction x has a linear orientation, i.e., measuring standard 10 and scanning unit 20 are linearly displaceable with respect to each other. Detector system 26 includes detector areas 26.1 to 26.n, which are sensitive to radiation and are periodically disposed at a third periodicity $d_3$ in a detection plane in measuring direction x. In this example embodiment, a collimation optics system 22 is furthermore connected upstream from light source 21, via which the radiation emitted by light source 21 is collimated before it impinges upon the scale grating. However, it should be understood that such a collimation optics system is not mandatory.

Measuring standard 10 and scanning unit 20 of the optical position-measuring device are usually connected to objects in the form of machine components that are displaceable relative to one another in measuring direction x. The phase-shifted incremental signals generated with the aid of the position-measuring device may be used in a machine-control unit for determining the relative position of scanning unit 20 in measuring direction x with respect to measuring standard 10, and thus for determining the relative position of the objects that are displaceable relative to one another, and may be used for controlling the displaceable machine components.

In the illustrated example embodiment, the optical position-measuring device is arranged as a transmitted-light system. A transmission grating, which is situated on a measuring-standard carrier 11, e.g., a glass lamella, functions as periodic scale grating 13, of which a partial plan view is illustrated in FIG. 2a. Scale grating 13 has scale-grating regions 13a, 13b that have different transmission properties and are situated in an alternating fashion in measuring direction x at first periodicity $d_1$, i.e., scale grating 13 is arranged as an amplitude grating. In this instance, scale-grating regions 13b illustrated in black are arranged in opaque form in FIG. 2a, and scale-grating regions 13a illustrated in a light color are transparent.

The optical position-measuring device uses a three-grating scanning principle for the generation of displacement-dependent incremental signals, as described in the document by R. Pettigrew, "Analysis of Grating Imaging and its Application to Displacement Metrology," SPIE Vol. 36, 1st European Congress on Optics Applied to Metrology (1977), pp. 325 to 333, mentioned above, whose basic scanning optical path is illustrated in FIG. 3. Periodic scale grating 13 constitutes the first grating in the scanning optical path, which is illuminated by the bundle of rays emitted by light source 21. Scale grating 13 has first periodicity $d_1$, which, as illustrated in FIG. 2a, indicates the sum of the widths of sequentially arranged transparent and opaque regions 13a, 13b in measuring direction x. Scanning grating 24 in scanning unit 20 functions as the second impinged-upon grating in the scanning optical path and, according to the conventional arrangement described the Pettigrew document mentioned above, is arranged at normal distance u from scanning grating 13 in the beam propagation direction. Scanning grating 24, which is arranged as an amplitude grating in this example embodiment, has second periodicity $d_2$, which according to FIG. 2b indicates the sum of the widths of sequentially arranged transparent and opaque regions 24a, 24b in scanning grating 24 in measuring direction x. Finally, the third and last grating in scanning optical path is detector system 26, which is arranged as a structured detector and includes a plurality of rectangular, radiation-sensitive detector regions 26.1 to 26.n in the detection plane, as illustrated in FIG. 2c. In the detection plane, the n detector regions 26.1 to 26.n are periodically placed at third periodicity $d_3$ in measuring direction x. In the illustrated exemplary embodiment, periodicity $d_3$ corresponds to the width of four sequentially arranged detector regions 26.1 to 26.n in measuring direction x. The generation of four incremental signals, each of them shifted in phase by 90 degrees relative to one another, thus takes place with the aid of detector system 26. In the conventional arrangement described in the Pettigrew document mention above, the detection plane of detector system 26 is located at normal-distance v from scanning grating 24 in the beam-propagation direction, as schematically illustrated in FIG. 3.

Such scanning produces a periodic fringe pattern having periodicity $d_3$ in the detection plane or on detector system 26 as a result of the interaction of the bundles of rays emitted by light source 21 and scale grating 13 as well as scanning grating 24. According to the Pettigrew document, the correlations indicated in the following equations 1) and 2) between periodicity $d_3$ of the fringe pattern or the periodicity of scale grating 13 and other geometrical system parameters in position-measuring devices based on this scanning principle are conventional. These relationships apply in the case of a scanning grating 14 in the form of an amplitude grating or a phase grating having a phase depth of approximately 90°:

$$d_3 = d_2 \cdot \frac{u+v}{u} \qquad \text{Eq. 1)}$$

and $$d_1 = d_2 \cdot \frac{u+v}{v} \qquad \text{Eq. 2)}$$

in which: $d_1$ represents the periodicity of the scale grating on the measuring standard; $d_2$ represents the effective period of the scanning grating; $d_3$ represents the periodicity of the fringe pattern in the detection plane of the detector system; v represents the normal clearance between the scanning grating and detection plane; and represents normal clearance between the scale grating and scanning grating.

If a scanning grating 14 in the form of a phase grating having a phase depth of 180° is used, then periodicity $d_2$ in these equations represents the effective scale division, which satisfies the relationship:

$$d_2 = 2 \cdot d_{2P}$$

in which $d_{2P}$ represents the actual periodicity of the phase grating.

In the case of a relative movement of measuring standard 10 and scanning unit 20, and thus a relative movement of scale grating 13 with respect to scanning grating 14 and detector system 26, the generated fringe pattern moves in the detection plane in measuring direction x across detector system 26. With the aid of the plurality of detector regions 26.1 to 26.n of detector system 26, a plurality of sinusoidal incremental signals that are shifted in phase relative to one another are thereby able to be generated in a conventional manner, such as three incremental signals having a mutual phase shift of 120°, or four incremental signals that feature a 90° phase shift from one another in each case, which are able to be processed further by the machine control, for example.

The configuration described in the Pettigrew document is modified in the position-measuring device described herein, especially in order to avoid a contamination of scanning grating 24 and thus an adverse effect on the signal quality. As can be understood from FIG. 1, scanning grating 24 is disposed for this purpose between a first and a second transparent, plate-shaped carrier element 25.1, 25.2. Usable as carrier elements 25.1, 25.2, for example, are glass plates of a suitable thickness and a suitable refractive index n. The thickness of plate-shaped carrier elements 25.1, 25.2 may be in the range of 0.1 mm to 5 mm. In addition, the space between scanning grating 24 and detector regions 26.1 to 26.n is completely filled with a material that has a refractive index n>1.3. In this particular exemplary embodiment, this space is taken up by second carrier element 25.2, as illustrated in FIG. 1.

FIG. 4 shows an enlarged partial view of scanning unit 20 of FIG. 1, in which geometrical quantities of the position-measuring device, which are discussed below, are indicated. For example, according to FIG. 4, due to the modified configuration of scanning unit 20, normal spacing u between scale grating 13 and scanning grating 24 is replaced with the expression $u_1+u_2/n_{u2}$ in the aforementioned equations 1) and 2), and normal clearance v between scanning grating 24 and the detection plane must be replaced with the expression $v/n_v$; $n_{u2}$ and $n_v$ represent the refractive indices of the two carrier elements 25.1, 25.2, which must be taken into account. In comparison with the above equations 1) and 2), the modified relationships 1.1) and 2.1) result for first periodicity $d_1$ of the scale grating and third periodicity $d_3$ of the resulting fringe pattern in the detection plane:

$$d_1 = d_2 \cdot ((u_1+u_2/n_{u2})+v/n_v)/(v/n_v) \qquad \text{Eq. 1.1)}$$

and $$d_3 = d_2 \cdot ((u_1+u_2/n_{u2})+v/n_v)/(u_1+u_2/n_{u2}) \qquad \text{Eq. 2.1)}$$

in which $d_1$ represents the first periodicity of the scale grating; $d_2$ represents the effective second periodicity of the scanning grating; $d_3$ represents the third periodicity of the fringe pattern resulting in the detection plane; $u_1$ represents the clearance between the scale grating and the adjacent boundary surface of the first carrier element; $u_2$ represents the thickness of the first carrier element placed between the scale grating and scanning grating; v represents the thickness of the second carrier element placed between the scanning grating and the detection plane; $n_{u2}$ represents the refractive index of the first carrier element; and $n_v$ represents the refractive index of the second carrier element.

With the aid of such an arrangement of scanning grating 24 on one of the two boundary surfaces G2, G3 of carrier elements 25.1, 25.2 facing each other, it is reliably protected from possible contamination because liquids, for example, are unable to reach scanning grating 24. Undesired adverse effects on the quality of the generated incremental signals due to contamination are thereby avoidable.

In addition, completely filling the space between scanning grating 24 and detector system 26 with second carrier element 25.2 ensures that this region will also not be contaminated by liquids and the scanning will not be adversely affected. Moreover, the required clearance v between scanning grating 24 and the detection plane is able to be adjusted very precisely and in a reproducible manner via the thickness of second carrier element 25.2.

Scanning grating 24 may be applied or placed either on first carrier element 25.1, which is first passed through in the beam propagation direction, or it may be applied or placed on second carrier element 25.2, i.e., on one of the two boundary surfaces G2 or G3 of carrier elements 25.1, 25.2 that face each other. The respective other carrier element 25.2 or 25.1 is bonded to carrier element 25.1, 25.2 on which scanning grating 24 is provided. The corresponding stack made up of the two bonded carrier elements 25.1, 25.2 and inside-lying scanning grating 24, with resulting thickness v+u$_2$, may subsequently be bonded onto detector system 26. The unit thus obtained, including detector system 26 and the carrier-element stack with scanning grating 24, is able to be installed at desired clearance u$_1$ from scale grating 13.

In such a case, it would also be necessary to take into account in equations 1.1) and 2.1) the respective thickness and the refractive index of the adhesive layer between carrier elements 25.1, 25.2 and between boundary surfaces G2 and G3 as well as the adhesive layer between carrier element 25.2 and detector system 26 and between boundary surface G4 and detector system 26.

Moreover, clearance u$_1$ between scale grating 13 and adjacent boundary surface G1 of first carrier element 25.1 impinged upon in the beam path may be in the range of 10 μm to 200 μm, and, more specifically, in the range of 20 μm to 50 μm, in the position-measuring device. Such a selected small clearance u$_1$ has the result that fluid droplets possibly present on the surface of measuring standard 10 are flattened and thus are no longer able to have an adverse effect on the optical scanning. Without the provision of scanning grating 24 between the at least two carrier elements 25.1, 25.2 at u$_2$>0, the choice of such a small clearance u$_1$ for such a scanning principle in the case of u$_2$=0 using the afore-discussed relations 1) and 2) from the corresponding publication would be possible only by accepting a reduced signal quality.

In an example embodiment of the position-measuring device, the various geometrical system parameters may be selected as follows:

$d_1$=20 μm
$d_2$=16 μm
$d_3$=80 μm
λ=850 nm (wavelength of the used light source)
$u_1$=0.033 mm
$u_2$=0.514 mm
$n_{u2}$=1.5
v=2.256 mm
$n_v$=1.5

Figure 5A:
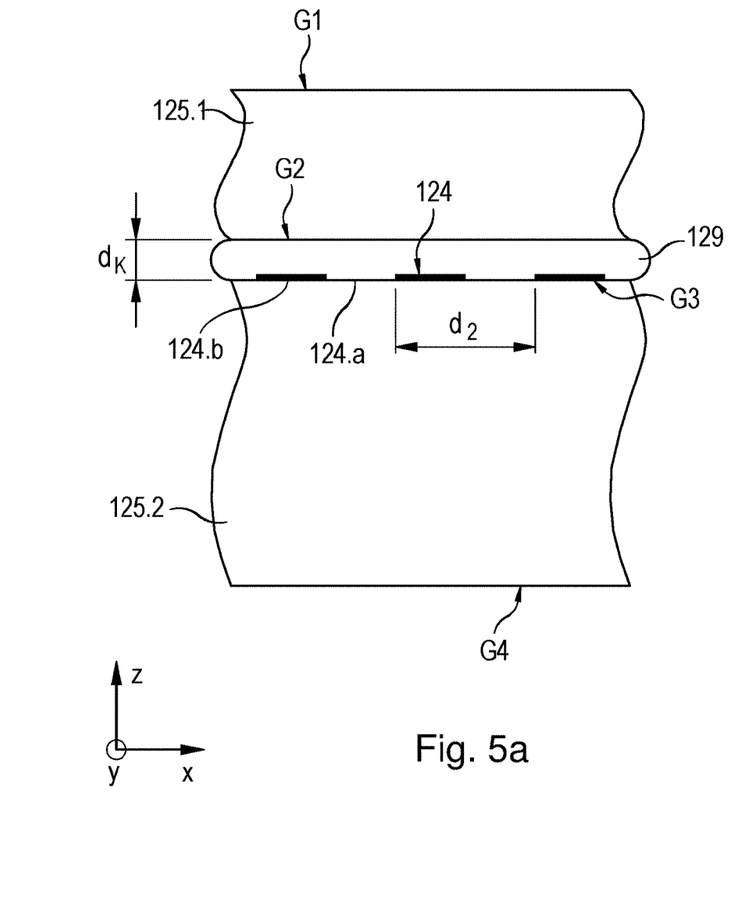
FIGS. 5a and 5b are partial views of the scanning unit in different variants of the position-measuring device.
Figure 5B:
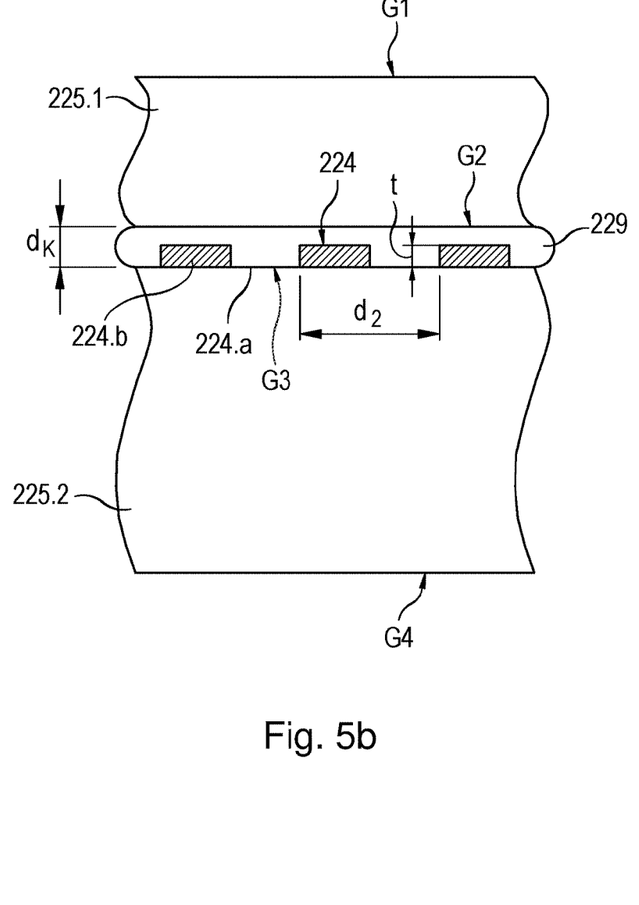

Referring to FIGS. 5a and 5b, variants of the position-measuring device are described in more detail below. FIGS. 5a and 5b are respective detail views of two carrier elements that are bonded together and between which differently configured scanning gratings are arranged.

FIG. 5a illustrates the substantially identical configuration with regard to the aforementioned exemplary embodiment, in which scanning grating 124, which is arranged as an amplitude grating, is provided between the two glass plates that function as carrier elements 125.1, 125.2. This scanning grating 124 includes scanning-grating regions 124.a, 124.b that have different optical transmittances and are provided in alternation in measuring direction x. Reference numeral 124.a denotes the transparent scanning-grating regions, and reference numeral 124.b denotes the opaque scanning-grating regions, which are provided in the form of a thin chromium layer, for example. Periodicity d$_2$ of scanning grating 124 corresponds to the sum of the widths of two scanning-grating regions 124.a, 124.b having different transmission properties in measuring direction x. As can be understood from FIG. 5a, scanning grating 124 is provided on boundary surface G3 of second carrier element 125.2 that is facing first carrier element 125.1. In addition, adhesive layer 129 having thickness d$_k$ between the two carrier elements 125.1, 125.2, via which the two carrier elements 125.1, 125.2 will be connected to each other, is illustrated in FIG. 5a.

In contrast, FIG. 5b illustrates a further modified variant for a possible configuration of the position-measuring device. Scanning grating 224 between the two carrier elements 225.1, 225.2 is arranged as a phase grating in this instance and includes scanning-grating regions 224.a, 224.b that are provided in alternation in measuring direction x and have different optical phase depths, and thus different phase-shifting effects. For this purpose, phase webs that have web height t and include, e.g., a highly refractive material such as Ta$_2$O$_5$ are disposed in scanning-grating regions 224.b at boundary surface G3 of second carrier element 225.2, while scanning-grating regions 224a are arranged as corresponding gaps without phase webs. The two carrier elements 225.1, 225.2 are connected to each other via an adhesive layer 229 having a thickness d$_k$. In this case, thickness d$_k$ of adhesive layer 229 must be chosen as being greater than web height t of the phase webs or scanning-grating regions 224.b. A decisive factor in the choice of the phase-web material is furthermore that its refractive index is clearly greater than the refractive index of adhesive layer 229 between the two carrier elements 225.1, 225.2, if possible. The refractive index of adhesive layer 229 must be taken into account in the choice of the web height of the phase webs in order to achieve the desired optical phase depth of the scanning grating. Periodicity d$_2$ of scanning grating 224 once again corresponds to the sum of the widths of two scanning-grating regions 224.a, 224.b with different phase-shifting effects in measuring direction x. A scanning grating 224, arranged as a phase grating, may be provided between the two carrier elements 225.1, 225.2. This makes it possible to ensure that no fluid collects in scanning-grating regions 224.a without phase structures and thereby affects the optical effect of scanning grating 224 in an undesired manner.

In addition to the example embodiments described above, other arrangements are possible within the spirit and scope hereof.

For example, instead of glass as the material for the carrier elements, it is also possible to use suitable transparent plastics or glass ceramics that feature a suitable refractive index. Also possible is a combination of a first carrier element made of glass and facing the measuring standard, and a second carrier element made of plastic. Forming the first carrier element of glass ensures excellent protection against possible scratches caused by metal chips and/or against chemical attacks caused by cooling lubricants.

The second carrier element of plastic is able to be produced very cost-effectively and is situated in a protected manner between the first carrier element of glass and the detector system. The outside lying edges of the second carrier element of plastic may additionally be protected from chemical attacks by suitable molding compounds.

In addition, if necessary, it is also possible to provide structures that have more than only two carrier elements placed in the form of a stack.

Moreover, it is not only position-measuring devices for detecting linear relative movements that are able to be provided. Instead, correspondingly arranged scanning units may also be used in rotary position-measuring devices, etc.

What is claimed is:

1. A position-measuring device for determining a position of a first object with regard to a second object that is displaceable relative to the first object in at least one measuring direction, comprising:
    a measuring standard that extends along the measuring direction and that is connectable to the first object, the measuring standard including at least one periodic scale grating arranged as a transmission grating and having a first periodicity; and
    a scanning unit connectable to the second object and including at least one light source, at least one periodic scanning grating having a second periodicity, and a detector system including detector regions that are sensitive to radiation and are periodically arranged in a detection plane at a third periodicity in the measuring direction;
    wherein the light source is adapted to emit bundles of rays to first impinge upon the scale grating, to then pass through the scanning grating, to produce a periodic fringe pattern having the third periodicity in the detection plane from interaction of the bundles of rays with the scale grating and the scanning grating, the scanning unit adapted to generate a plurality of incremental signals that are phase-shifted relative to one another in accordance with scanning of the fringe pattern by the detector system;
    wherein the scanning grating is arranged between at least one first transparent, plate-shaped carrier element and at least one second transparent, plate-shaped carrier element, a space between the scanning grating and the detector regions being completely filled with a material that has a refractive index of n>1.3; and
    wherein a clearance between the scale grating and an adjacent boundary surface of the first carrier element is between 10 μm and 200 μm.

2. The position-measuring device according to claim 1, wherein the clearance between the scale grating and the adjacent boundary surface of the first carrier element is between 20 μm and 50 μm.

3. The position-measuring device according to claim 1, wherein the plate-shaped carrier elements are made of glass.

4. The position-measuring device according to claim 1, wherein the first plate-shaped carrier element is made of glass and the second plate-shaped carrier element is made of transparent plastic.

5. The position-measuring device according to claim 1, wherein the plate-shaped carrier elements have a thickness of at least 0.1 mm.

6. The position-measuring device according to claim 1, wherein the plate-shaped carrier elements have a maximum thickness of 5 mm.

7. The position-measuring device according to claim 1, wherein the scanning grating is arranged on one of two boundary surfaces of the two carrier elements facing each other.

8. The position-measuring device according to claim 7, wherein the scanning grating includes an amplitude grating and scanning-grating regions of different optical transmittances.

9. The position-measuring device according to claim 7, wherein the scanning grating includes a phase grating and scanning-grating regions of different optical phase depths.

10. The position-measuring device according to claim 1, wherein the following relationships of the first periodicity of the scale grating and the third periodicity of the resulting fringe pattern in the detection plane are satisfied:

$$d_1 = d_2 \cdot ((u_1 + u_2/n_{u2}) + v/n_v)/(v/n_v)$$

and $$d_3 = d_2 \cdot ((u_1 + u_2/n_{u2}) + v/n_v)/(u_1 + u_2/n_{u2})$$

wherein: $d_1$ represents the first periodicity of the scale grating; $d_2$ represents an effective second periodicity of the scanning grating; $d_3$ represents the third periodicity of the fringe pattern resulting in the detection plane; $u_1$ represents the clearance between the scale grating and the adjacent boundary surface of the first carrier element; $u_2$ represents a thickness of the first carrier element located between the scale grating and the scanning grating; v represents a thickness of the second carrier element located between the scanning grating and the detection plane; $n_{u2}$ represents a refractive index of the first carrier element; and $n_v$ represents a refractive index of the second carrier element.

11. The position-measuring device according to claim 1, wherein the first object and the second object are displaceable relative to each other in a linear measuring direction.

12. The position-measuring device according to claim 1, wherein the first object and the second object are displaceable relative to each other in a rotary measuring direction.

13. The position-measuring device according to claim 1, wherein the first and second objects include components of a machine tool.

14. The position-measuring device according to claim 1, wherein the first object is a stationary object, and the second object is movable in relation to the first object in the measuring direction.

15. A position-measuring device for determining a position of a first object with regard to a second object that is able displaceable relative to the first object in at least one measuring direction, comprising:
    a measuring standard that extends along the measuring direction and that is connected to the first object, the measuring standard including at least one periodic scale grating arranged as a transmission grating and having a first periodicity; and
    a scanning unit connected to the second object and including at least one light source, at least one periodic scanning grating having a second periodicity, and a detector system including detector regions that are sensitive to radiation and are periodically arranged in a detection plane at a third periodicity in the measuring direction;
    wherein the light source is adapted to emit bundles of rays to first impinge upon the scale grating, to then pass through the scanning grating, to produce a periodic fringe pattern having the third periodicity in the detection plane from interaction of the bundles of rays with the scale grating and the scanning grating, the scanning unit adapted to generate a plurality of incremental signals that are phase-shifted relative to one another in accordance with scanning of the fringe pattern by the detector system;

wherein the scanning grating is arranged between at least one first transparent, plate-shaped carrier element and at least one second transparent, plate-shaped carrier element, a space between the scanning grating and the detector regions being completely filled with a material that has a refractive index of $n>1.3$; and wherein a clearance between the scale grating and an adjacent boundary surface of the first carrier element is between 10 μm and 200 μm.

\* \* \* \* \*

UNITED STATES PATENT AND TRADEMARK OFFICE
CERTIFICATE OF CORRECTION

PATENT NO. : 10,571,310 B2
APPLICATION NO. : 15/830945
DATED : February 25, 2020
INVENTOR(S) : Wolfgang Holzapfel et al.

It is certified that error appears in the above-identified patent and that said Letters Patent is hereby corrected as shown below:

On the Title Page

Item (71), after "Applicants:" please change:
"DR. JOHANNES HEIDENHAIN GmbH, Traunreut (DE); Sandra Trautner, Bad Kissingen (DE)"
To:
-- DR. JOHANNES HEIDENHAIN GmbH, Traunreut (DE) --

Signed and Sealed this
Sixteenth Day of June, 2020

Andrei Iancu
*Director of the United States Patent and Trademark Office*